United States Patent
Millman et al.

[15] 3,674,045
[45] July 4, 1972

[54] VORTEX VALVE FLUID OSCILLATOR

[72] Inventors: William V. Millman, Moline, Ill.; Endre A. Mayer, Birmingham, Mich.

[73] Assignee: The Bendix Corporation

[22] Filed: July 14, 1970

[21] Appl. No.: 54,708

[52] U.S. Cl. .................................................. 137/81.5
[51] Int. Cl. .................................................. F15c 1/16
[58] Field of Search ................................... 137/81.5

[56] References Cited

UNITED STATES PATENTS

| | | | |
|---|---|---|---|
| 3,490,474 | 1/1970 | Larson | 137/81.5 |
| 3,424,182 | 1/1969 | Mayer | 137/81.5 |
| 3,519,008 | 7/1970 | Fish | 137/81.5 |
| 3,276,259 | 10/1966 | Bowles et al. | 137/81.5 X |
| 3,320,966 | 5/1967 | Swartz | 137/81.5 |
| 3,347,103 | 10/1967 | High et al. | 137/81.5 UX |
| 3,486,521 | 12/1969 | Mayer | 137/81.5 |
| 3,511,257 | 5/1970 | Chow | 137/81.5 |
| 3,515,158 | 6/1970 | Utz | 137/81.5 |
| 3,521,657 | 7/1970 | Ayers | 137/81.5 |

Primary Examiner—Samuel Scott
Attorney—John R. Benefiel and Plante, Hartz, Smith & Thompson

[57] ABSTRACT

A vortex valve for use in a fluid oscillator circuit characterized by exhibiting a pronounced negative resistance characteristic in a portion of its operating range and by having a vortex chamber defined in part by a resiliently movable portion to provide a mechanical output in response to pressure variations in the chamber. This particular vortex valve is incorporated into a fluid oscillator arrangement to produce oscillatory pulses in the vortex chamber and responsive movements of the movable portion by adjusting the control and supply pressures and flows so as to be in the negative resistance range of the vortex valve while at the same time maintaining a constant supply flow.

8 Claims, 4 Drawing Figures

INVENTORS
ENDRE A. MAYER
WILLIAM V. MILLMAN

BY John R Benefiel
ATTORNEY

INVENTORS
ENDRE A. MAYER
WILLIAM V. MILLMAN

BY John R Benebiel
ATTORNEY

VORTEX VALVE FLUID OSCILLATOR

BACKGROUND OF THE INVENTION

1. Field of the Invention

This invention relates to fluidic oscillators and components therefor.

2. Description of the Prior Art

Many potential uses for sound generators have arisen in recent years in the fields of ultrasonics, sonar, cleaning and drying, holography, etc. Most such devices rely on electromechanical or mechanical arrangements, but it would be desirable to accomplish this function solely by fluidic means, i.e., by a fluidic oscillator arranged to produce a sonic output since reliability could be improved while enhancing its simplicity and reducing costs.

In addition, the great development of fluidics has created a need for high power fluid oscillators for use in fluidic circuits.

In any such fluidic oscillator for sound generators, it would be necessary to transform the fluid pressure pulses into a sonic output for these applications.

Hence, it is an object of the present invention to provide a high power fluidic oscillator.

It is another object of the present invention to provide an arrangement for creating a sonic or mechanical output from the vortex device used in the fluidic oscillator.

SUMMARY OF THE INVENTION

These and other objects which will become apparent uPon a reading of the following specification and claims are accomplished by utilizing a vortex valve which has tangentially opposed control and supply ports of differing aggregative areas to produce a pronounced negative resistance characteristic, with a portion of the vortex chamber being resiliently movable. By properly controlling the supply flow and control pressure, high power oscillation of compressible fluids in the circuit is obtained, with the movable portion providing a useful output.

DETAILED DESCRIPTION

In the following detailed description, certain specific terminology will be used for the sake of clarity, and a specific embodiment will be described in order to provide a better understanding of the invention, but it is to be understood that the invention is not so limited and may be practiced in a variety of forms and embodiments.

Figure 1:
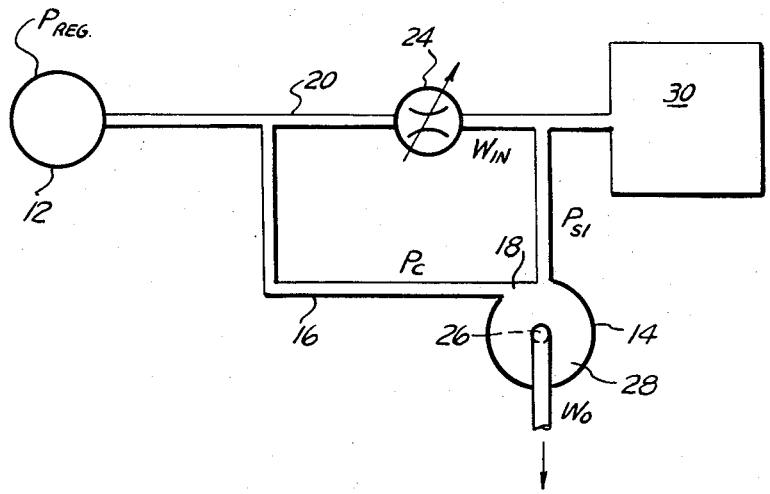
FIG. 1 is a schematic representation of a fluidic oscillator circuit.

Referring to the drawings and particularly FIG. 1, a schematic representation of a basic fluidic oscillator circuit 10 is shown.

This circuit includes a source of regulated fluid pressure 12 which is connected to a vortex valve 14 via line 16 to the control port 18 and line 20 connected to the supply port 22 via orifice 24. The orifice 24 is provided to produce a constant flow therethrough at constant source pressures regardless Of downstream pressure variations. This may be accomPlished by insuring pressure ratios greater than critical will exist across the orifice throughout the operating range of the circuit.

The vortex valve is provided with outlet 26 centrally located in the vortex chamber 28 in the conventional manner, and vented to the atmosphere.

The volume of the vortex chamber 28 and connected passages downstream of the orifice 24 and upstream of the outlet 26 is represented schematically as volume 30.

Conventional vortex valves in themselves are well known in the art, see for example U.S. Pat. No. 3,424,182 by one of the present coinventors, and hence it is not felt necessary to describe the operation or design of these devices in detail. These devices usually include a peripheral, circumferential wall defining a vortex chamber, with supply and control ports arranged to discharge fluid thereinto, with the supply port usually directing fluid radially toward the outlet and the control ports introducing fluid in a direction having a component tending to produce vortical flow with respect to the central, axially extending outlet. The degree of vorticity thereby induced controls the flow occurring through the chamber for a given radial pressure difference, in a manner now well known in the art, as evidenced by the referenced patent.

However, the oscillator circuit of FIG. 1 requires a vortex valve having a "negative resistance characteristic" at a constant control pressure in the operating range of the circuit.

Figure 2:
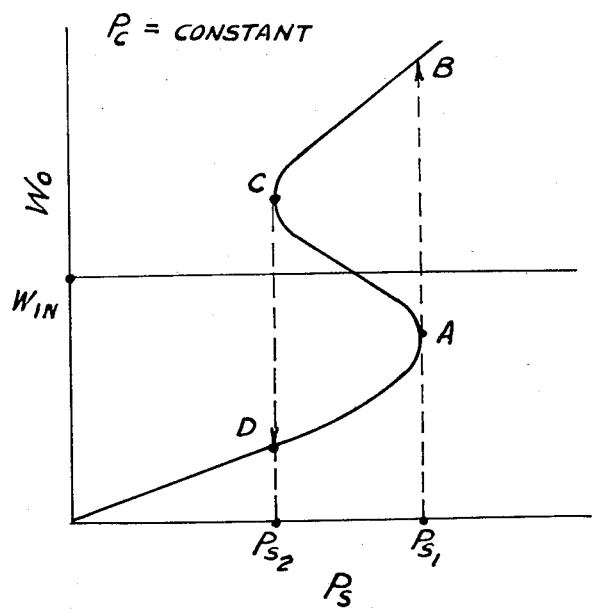
FIG. 2 is a pressure-flow plot representing flow in the vortex device used in the present invention in a portion of its operatinG range.

This is shown in the plot of FIG. 2, wherein the flow, $W_o$ through the vortex valve 14 is plotted against the vortex valve supply pressure, $P_s$, for a constant valve of control pressure, $P_c$. As indicated, as the supply pressure $P_s$ is increased, the flow $W_o$ also increases until the point A is reached at a supply pressure $P_{s_1}$. Thereafter, the flow $W_o$ will increase with decreasing supply pressures (hence the term "negative resistance") until point C is reached at a supply pressure $P_{s_2}$ when the flow $W_o$ again increases only with increasing values of supply pressure $P_s$, to thus provide a negative resistance range intermediate positive resistance ranges therein.

This characteristic has been found to be much pronounced in vortex valves in which the supply and control ports both direct flow into the vortex chamber offset from the outlet so as to have at least a tangential component and in opposing directions, with the ports being of differing cross sectional areas. Such a valve will be described in greater detail herein, while a more detailed discussion and analysis is contained in copending application Ser. No. 1504, "Opposing Control Vortex Valve" by a coinventor of the present application, and assigned to the same assignee as that of the present application.

The operation of the circuit shown in FIG. 1 is as follows: If the orifice restrictor 24 is selected to provide a constant flow $W_{in}$ which value is intermediate the negative resistance segment of the operating curve at the control pressure $P_c$ (as indicated in FIG. 2), the flow $W_{in}$ will initially be greater than that leaving the vortex chamber, $W_o$. Hence, the pressure $P_s$ will rise in the volume 30 downstream of the orifice 24 in the vortex chamber 28 until point "A" is reached. Further pressure build-up will cause the flow $W_o$ to shift to the higher value at point "B," which is greater than $W_{in}$, hence immediately creating a decline in $P_s$ since the net flow will be out of the volume 30. This will continue until point "C" is reached, where the flow $W_o$ will then shift to point "D," so that the value of $W_{in}$ will again be greater than $W_o$ and the pressure $P_s$ will again rise to repeat the cycle.

This produces oscillations of the pressure $P_s$ of a frequency $f$ which is related to the volume 30 as follows:

$$f = K_f \, 1/V$$

where $K_f$ is gas dependent variable and under certain conditions may be calculated for the steady state vortex valve characteristic and gas properties:

$$K_f = (2\Delta W_o)/(\Delta P_s)(KR_oT)$$

From this explanation it can be appreciated that the pressure swing from $P_{s_1}$ to $P_{s_2}$ and vice versa and hence the power output of the device is directly dependent on the extent of the negative resistance segment, i.e., the pressure difference represented by points A and C.

It should be noted that in the event the pressure difference is sufficient to cause flow into the supply ports to be sonic, the volume 30 will be that of the vortex chamber 28 itself.

Figure 3:
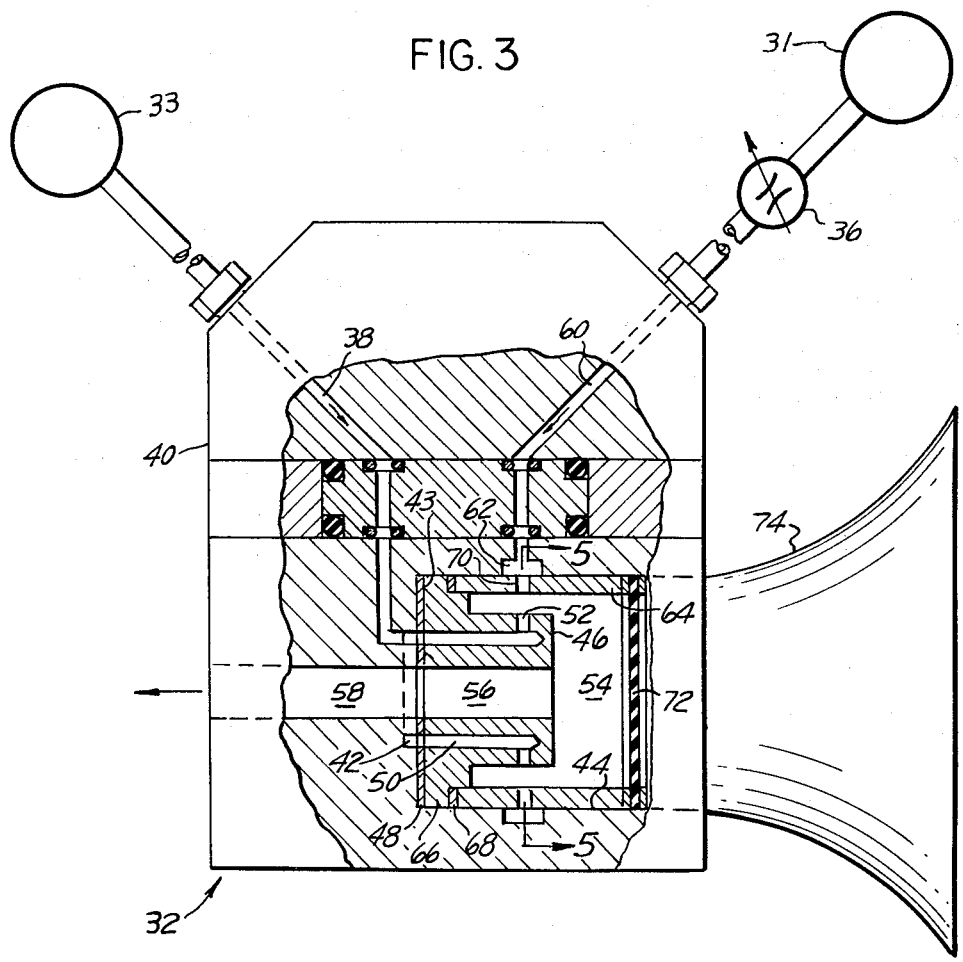
FIG. 3 is a partially sectional view of a vortex device used in the oscillating circuit of the present invention together with a schematic representation of the supply and control pressure connections.
Figure 4:
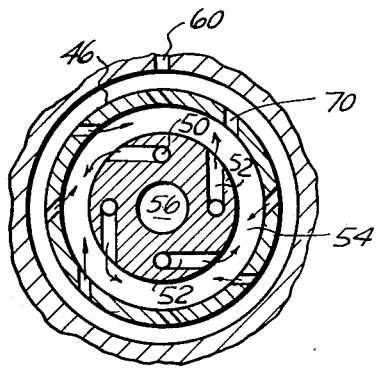
FIG. 4 is a view of the section take along the line 4—4 in FIG. 3.

Referring to FIGS. 3 and 4, a specific embodiment of a vortex valve 32 according to the present invention is shown, together with a schematic representation of the rest of the fluid oscillator circuit.

The circuit includes a source of regulated control pressure 34 and a source of regulated supply pressure 36, which although shown as separate may be a single common pressure source.

The source of regulated supply pressure 34 is connected to the vortex valve 32 via an adjustable orifice 36. This adjustable orifice 36 is used to provide a constant supply flow $W_{in}$ through the range of operating conditions encountered in the system of a magnitude equal to $W_{in}$, i.e., intermediate the points A and C of the constant control pressure flow-supply pressure curve shown in FIG. 2.

The source of regulated control pressure 33 is connected to a passage 38 in the valve housing 40, which in turn communicates with an annular recess 42, formed in the bottom 43 of a bore 44 formed in the valve housing 40.

A button member 46 is disposed in the bore 44, seated against the bottom 43 with an intermediate teflon seal 48.

The button member 46 has formed therein a plurality of passages 50 spaced so as to intercept the annular recess 42, and in turn communicating with a plurality of control ports 52 disposed to direct fluid tangentially into the vortex chamber 54.

An exhaust passage 56 is formed in the center of the button member 46 aligned with vent passage 58 formed in the valve housing 40, to provide the vortex chamber outlet.

The source of regulated supply pressure 34 communicates with a passage 60 which in turn communicates with an annular recess 62 formed in the periphery of the bore 44.

Disposed in the bore 44 and partially defining the vortex chamber 54 is a sleeve member 64, seating on a shoulder 66 of the button member 46 with an intermediate teflon seal 68.

A plurality of supply ports 70 are provided aligned with the annular recess 62 so as to receive fluid from the source 34 and direct it tangentially into the chamber 54, substantially aligned with the control ports 52 and in a direction opposite thereto.

As mentioned above, a strong negative resistance characteristic is obtainable from this configuration for certain control pressures with the aggregate cross sectional area of the control ports 52 being less than that of the supply ports 70. In an actual design, eight supply ports 70 of 0.026 in. diameter, and four control ports of 0.024 in. diameter with a vortex chamber diameter of 0.250 inches was used successfully, with 100 to 500 psi nitrogen gas being the source of regulated pressure for both the supply and control.

Located axially offset from the control and supply ports 52, 70 and forming one end of the vortex chamber is a resilient diaphragm 72 fixed about its periphery and resiliently movable so as to create a resiliently expansible vortex chamber 54. Thus, as the pressure $P_s$ oscillates the chamber 54 pressure will oscillate, in turn causing the diaphragm 72 to pulse.

The diaphragm 72 may be combined with other devices to perform useful functions, such as for example with an exponential horn 74 to produce a sound generator for drying, sonar, or other practical uses of sonic energy.

While oscillations of the frequency predicted by the above given equation were successfully obtained, under some conditions very high frequency, high power oscillations have occurred with compressible fluids. In one configuration in which 100–500 psig nitrogen gas was used as the control and supply pressure sources and using eight sleeve ports of 0.025 in. diameter with three button ports of 0.024 in. diameter, oscillations of 139,000 cps were noted. For similar pressures and geometry, other gases such as a mixture of 72 percent nitrogen, 28 percent helium by weight gave oscillations up to 248,000 cps with good pressure and amplitudes.

This high frequency mode of oscillation has not been explained by confirmed theories of operation, but must necessarily be a distinct mode of operation from that described supra, since these frequencies are several orders higher than that predicted by the above-given equation.

These high frequency oscillations are of an order making them particularly useful in drying applications since it has been established that drying times are greatly reduced by the application of high frequency sonic energy.

While particular embodiments have been shown and described, the invention is by no means limited thereby, but may be practiced in a variety of forms and configurations.

What is claimed is:

1. A vortex valve oscillator including:
   vortex valve means including a vortex chamber including a peripheral wall and an outlet located within said peripheral wall, supply pressure means for directing fluid into said chamber and including supply port means in said vortex chamber, control pressure means for directing fluid into said chamber offset from said outlet and including control port means in said vortex chamber, said vortex valve means including means providing a negative resistance range in an operating range of said vortex valve means producing reduced flow through said outlet in response to increases in pressure at one of said supply or control pressure means, intermediate positive resistance ranges therein wherein increased flow through said outlet is produced by increases in pressure at said one of said supply or control pressure means, and
   means for providing a constant flow by said one of said supply or control pressure means within the negative resistance range of said vortex means, whereby oscillations of the pressure of said one of said supply or control means are produced.

2. The oscillator of claim 1 wherein said vortex chamber is defined at least in part by a resiliently movable portion.

3. The oscillator of claim 2 wherein said resiliently movable portion is disposed axially of the fluid introduced by said supply and control port means.

4. A vortex valve comprising:
   a vortex chamber defined in part by a peripheral wall;
   a vortex outlet located intermediate said peripheral wall;
   means directing fluid into said chamber in a direction having a tangential component with respect to said outlet; and
   a resiliently movable portion defining at least in part said vortex chamber, whereby pressure variations in said chamber can produce output movements of said portion.

5. The vortex valve of claim 4 wherein said movable portion is a resilient diaphragm member disposed opposite said outlet and defining the vortex chamber portion opposite said outlet.

6. The vortex valve of claim 4 wherein said means directing fluid into said chamber includes supply port means directing fluid into said chamber offset from said outlet and control port means directing fluid into said chamber offset from said outlet oppositely from said supply port means.

7. The vortex valve of claim 6 wherein said supply and control port means consist of openings into said vortex chamber of differing aggregative areas whereby a negative resistance range of said vortex valve is provided.

8. The vortex valve of claim 7 wherein said means directing fluid into said chamber further includes means maintaining the flow through either said supply port or control port means into said chamber at a constant rate, whereby chamber pressure oscillations will occur in the negative resistance range of said vortex valve.

* * * * *